United States Patent [19]
Keating et al.

[11] Patent Number: 5,479,972
[45] Date of Patent: Jan. 2, 1996

[54] EXTENSION TABLE FOR A TABLE SAW

[75] Inventors: Kent G. Keating, Amherst; Joseph A. Drago, Williamsville, both of N.Y.

[73] Assignee: Photo Sculptures, Inc., Amherst, N.Y.

[21] Appl. No.: 352,635

[22] Filed: Dec. 9, 1994

[51] Int. Cl.[6] .............................. B25H 1/00; B27B 3/28
[52] U.S. Cl. .................. 144/287; 83/477.2; 144/286 R
[58] Field of Search ................ 83/471.3, 477.2, 83/581, 471; 144/286 R, 286 A, 287, 1 R, 2 R

[56]         References Cited
        U.S. PATENT DOCUMENTS 4,106,381  8/1978  Kreitz ........................ 83/477.2
4,270,428  6/1981  Colberg ..................... 83/477.2
4,874,025  10/1989  Cleveland ................. 144/287
5,105,698  4/1992  Dunham ..................... 83/477.2

*Primary Examiner*—W. Donald Bray
*Attorney, Agent, or Firm*—Phillips, Lytle, Hitchcock, Blaine & Huber

[57]            ABSTRACT

The invention provides an extension table (27) adapted to attach to the table surface (13) of a table saw (10). An extension work surface (28) is parallel to the table surface, thus, forming a larger work surface. The extension work surface is generally U-shaped having a base portion (29) and two arms (30). The arms also integrate a unique guide fence apparatus which, when used in conjunction with a cutting blade having a circular surface, allows the saw operator to perform intricate cuts. The extension table is supported from the support frame (11) of the table saw (10) by four legs (63).

10 Claims, 4 Drawing Sheets

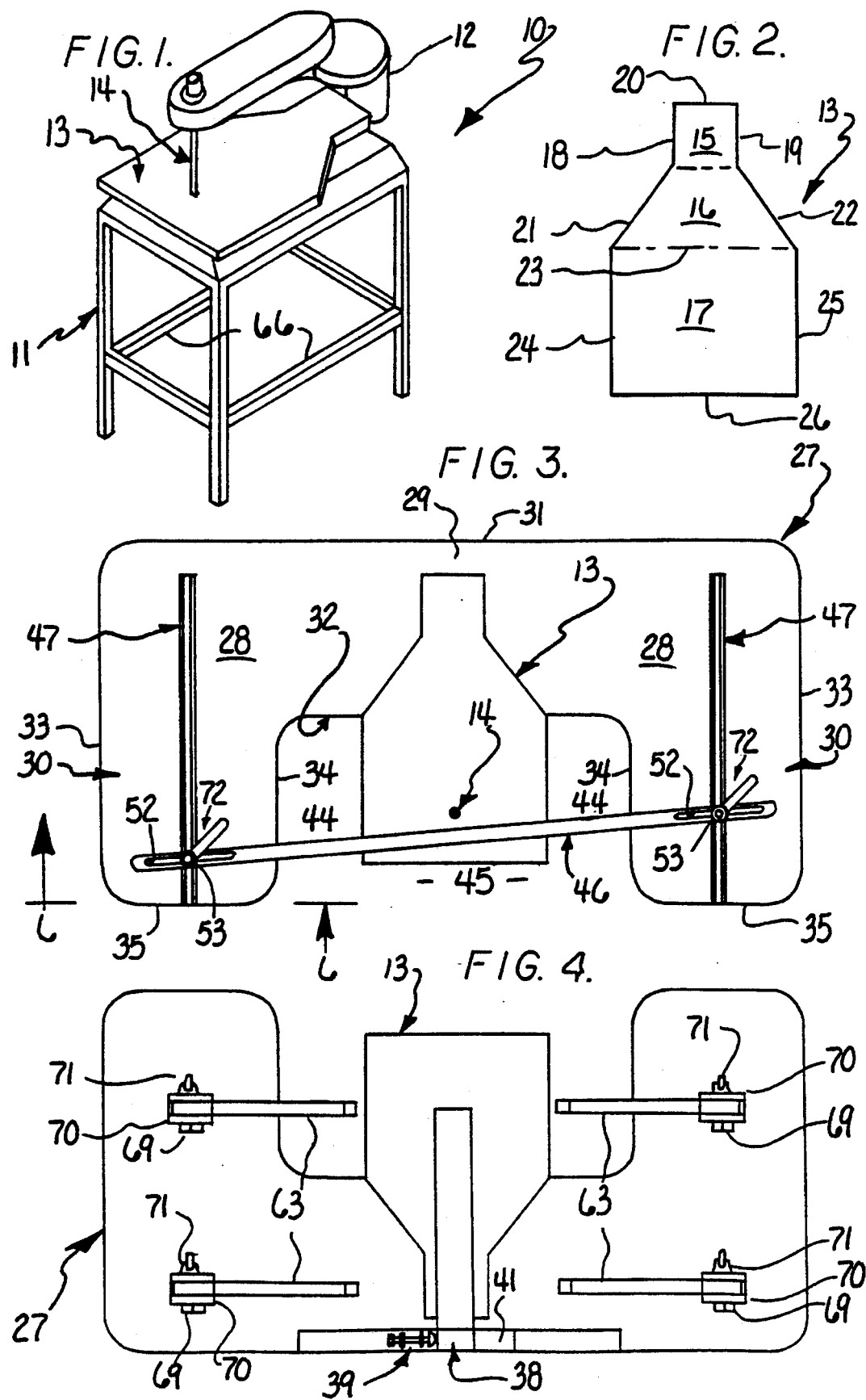

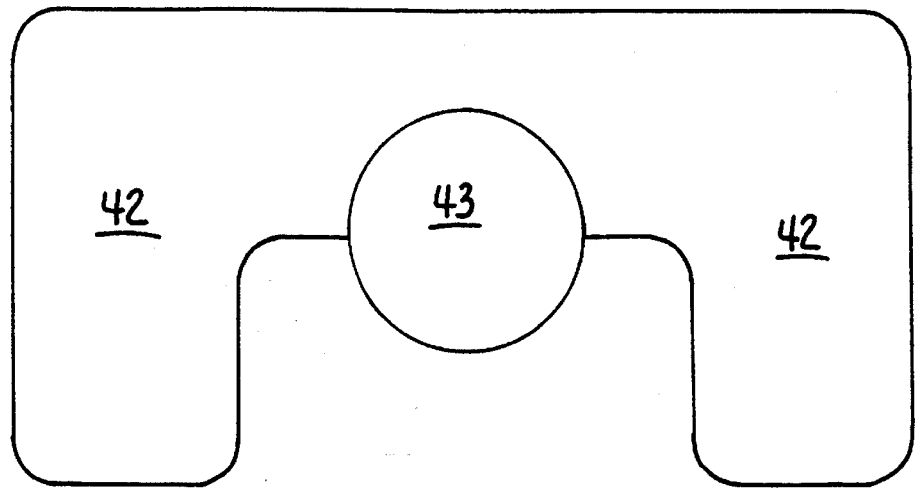
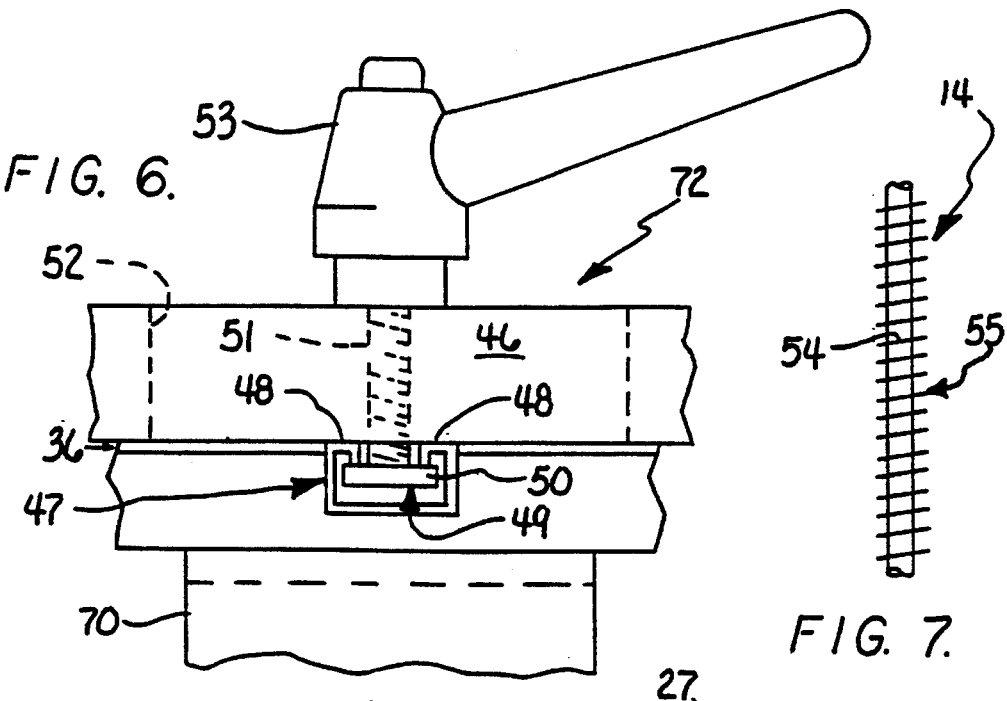
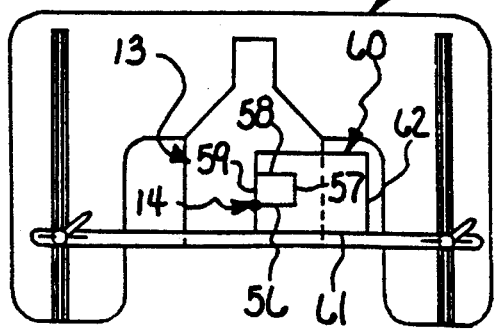

EXTENSION TABLE FOR A TABLE SAW

TECHNICAL FIELD

The present invention relates generally to an accessory item for certain conventional table saws (e.g., jig saw and scroll saw). More specifically, the present invention provides an extension table to facilitate precision cutting also having a unique guide fence apparatus capable of guiding a work piece through a succession of straight cuts without removing the work piece from contact with the cutting blade.

BACKGROUND OF THE INVENTION

It is well known in the art to provide table surfaces integrated with power saws (e.g., circular table saw, jigsaw, scroll saw, band saw). A table surface provides an area to support the work piece as it is pushed into the cutting blade of the table saw. Table surfaces come in a variety of shapes (e.g., rectangular, circular) and many different sizes.

Manufacturers also integrate conventional guide fence apparatus with table saws to increase the precision of straight cuts. It is also known to provide a guide fence apparatus adjustable between cuts, thus allowing the operator to make straight cuts along different lines of the work piece. A conventional guide fence apparatus is oriented perpendicular to the cutting surface of the table saw's cutting blade.

Many drawbacks exist when using a table surface and conventional guide fence apparatus. First, many times the table surface is not large enough to safely cut a work piece and simultaneously allow the operator to remain close to the cutting blade to facilitate precision cutting. Second, many table surfaces do not provide the operator the ability to manipulate the work piece by its bottom surface. Third, many conventional guide fence apparatus cannot guide a work piece along a multi-directional figure (e.g., a square) in one cut.

The present invention addresses each of these drawbacks. The invention provides a shaped extension work surface that attaches to the existing table saw providing a larger work surface. This allows the operator to perform more precise, safer cuts, even of larger items. Without the extension table, an operator may be forced to direct his attention to supporting and balancing the work piece if it is too large for the conventional table surface, thus, reducing the precision and safety of the table saw. Moreover, although manufacturers have used larger table surfaces, their shapes make it impossible for the operator to remain close to the cutting blade decreasing the operator's ability to perform intricate cuts. The shape of the extension work surface is generally U-shaped with cutting occurring near the center of the U-shape's base. The operator stands between the arms of the U-shape, thus, remaining close to the cut point to ensure precision while relying on the extension table to support a larger work piece.

In many instances, the best way to manipulate a work piece and perform an intricate cut is by working with its back surface. Normally, the back surface of a work piece is flush to the table surface. The invention contemplates gaps allowing manipulation of the work piece by its back surface.

Finally, an easily adjustable guide fence apparatus used in conjunction with a cutting blade having a circular cutting surface provide the ability to change directions of a guided cut without removing the work piece from contact with the cutting blade. To perform a series of guided cuts in different directions using a conventional guide fence, a cut is made in one direction, the work piece is removed, the saw fence adjusted, the work piece is placed on the table surface against the newly positioned guide fence and the next cut is made. The process is repeated until the series of desired cuts is completed. Using the invention, cuts are made by a blade having a circular cutting surface, and, instead of removing the work piece between cuts, a unique guide fence apparatus is adjusted and the work piece is rotated until the next desired cut direction is parallel to the guide fence.

The invention is designed to be supported by the existing support frame of a conventional table saw or the floor allowing backward compatibility with pre-existing table saws. The legs are adjustable in length and pivot at the connection point to the extension work surface. The combination of these attributes allows the operator to customize the position of the extension work surface in relation to the existing table surface depending on how the operator chooses to support the extension table (i.e., from the support frame of the conventional table saw or from the floor). The ability to perform these same adjustments insures the extension work surface will be flush and parallel to the existing table surface, insuring smooth motion of the work piece over the entire work surface.

Thus, the extension table provides a larger work surface without sacrificing the operator's closeness to the cutting blade, an opening to manipulate the work piece by its bottom surface and a unique guide fence apparatus used in conjunction with a cutting blade having a circular cutting surface to perform consecutive guided straight cuts in differing directions.

DISCLOSURE OF THE INVENTION

The present invention is an extension table (e.g. 27) attached to a table saw (e.g. 10) forming a composite work surface comprising the table surface (e.g. 13) of the conventional table saw and an extension work surface (e.g. 28). The composite work surface is larger than the table surface alone, thus, allowing the sate cutting of larger work pieces.

The extension work surface is generally U-shaped, having a base portion (e.g. 29) and two arms (e.g. 30). The table surface (e.g. 13) mates with part of the base portion's edge (e.g. 32). A clamp (e.g. 39) fixably attaches the extension table to the table saw. Further, at least two legs (e.g. 63) support the extension table against either the support frame (e.g. 11 ) or the ground. The combination of the legs and clamp fixes the extension work surface flush and parallel to the table surface providing a unitary, smooth and level cutting surface.

The interior edges of each arm (e.g., 34), and three edges of the table surface (e.g. 24, 25 and 26) define two types of gaps. First, the gaps (e.g. 44) between the side edges of the table surface (e.g. 24 and 25) and the interior edge of the arms (e.g. 34) allows manipulation of the work piece (e.g. 60) by its bottom surface. Second, the gap (e.g. 45) bounded by the bottom edge (e.g. 26) of the table surface and the interior edges of the arms (e.g. 34) allow the operator to stand closer to the cutting blade (e.g. 14) when performing intricate cuts.

A unique guide fence apparatus (e.g. 72) comprises an easily adjustable guide fence (e.g. 46) for use with a circular cutting blade (e.g. 14). Along each arm is a guide fence channel (e.g. 47). Each guide fence channel holds the first end (e.g. 50) of a member (e.g. 49). The second end (e.g. 51 ) of the member proceeds through an opening (e.g. 52) in the guide fence and is fixably grasped by a locking means (e.g.

53). The guide fence apparatus is adjustable and can be locked against the extension work surface when a guided cut is performed.

The guide fence apparatus, used in conjunction with a cutting blade (e.g. 14) having a circular cutting surface (e.g. 54) can perform guided consecutive cuts of connected straight lines without the need to halt the saw or remove the work piece from the cutting blade. A cutting blade having a circular cutting surface is capable of cutting in any direction the work piece is pushed or drawn into the cutting blade. Combining the attributes of the guide fence apparatus and the cutting blade, an operator can cut along a shape outline using a continuously guided single cut.

The cutting blade is guided along a shape outline portion (e.g. 56–59) by sliding the work piece against the guide fence. At the end of each portion of the outline, the guide fence is re-oriented and the work piece rotated to a new position such that when the work piece is drawn along the guide fence, the next portion of the shape outline is cut.

Accordingly, the present invention provides a device to increase the capability and efficiency of a conventional table saw.

It is an object of the invention to provide a suitable support surface for larger work pieces.

It is a further object of the invention to provide a shape for a work surface where the operator can remain relatively close to the cutting blade while the work surface is capable of supporting a larger work piece.

Still a further object of the invention is to provide openings in the work surface allowing manipulation of the work piece by its bottom surface.

Still a further object of the invention is to provide guide fence apparatus capable of performing a succession of guided cuts in different directions without needing to remove the work piece from contact with a cutting blade having a circular cutting surface.

BRIEF DESCRIPTION OF THE DRAWINGS

FIG. 1 is a perspective view of a table saw.

FIG. 2 is a top plan view of a table saw table surface.

FIG. 3 is a top plan view of a table surface and extension table.

FIG. 4 is a bottom plan view of a table surface and extension table.

FIG. 5 is a top plan view of a circular table surface and extension table joined.

FIG. 6 is a fragmentary plan view, partially cut-away, taken along line 6—6 of FIG. 3.

FIG. 7 is a front elevation of cutting blade 14.

FIG. 8 is a top plan view, partially cut-away of extension table 27 having work piece 60 arranged to be cut along line 56.

FIG. 9 is similar to FIG. 8 except work piece 60 is now cut along line 56 and arranged to be cut along 57.

MODES OF CARRYING OUT THE INVENTION

Figure 10:
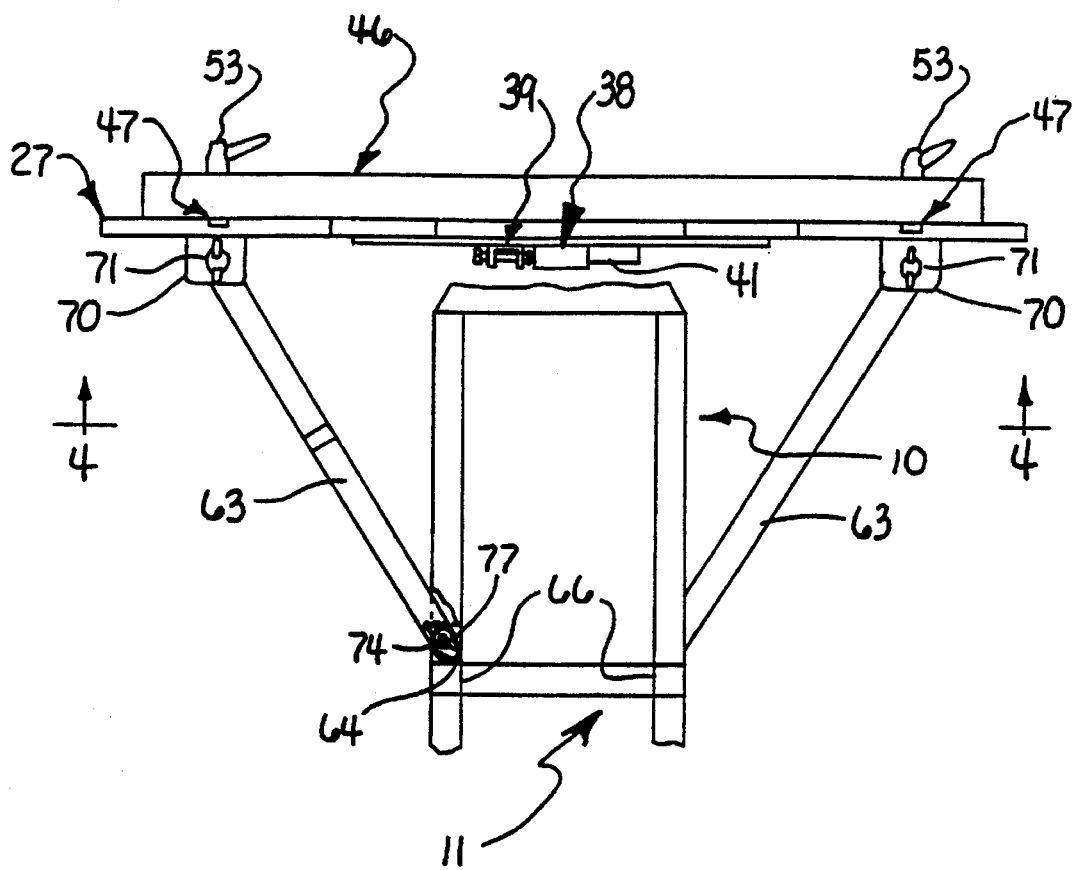
FIG. 10 is a front plan view, partially cut-away, of a table surface and extension table joined.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting to FIG. 1, table saw 10 is shown. The general features of table saw 10 are well known. Support frame 11 supports engine portion 12, table surface 13 and cutting blade 14. Adverting now to FIG. 2, table surface 13 is a combination of three shapes; small square 15, trapezoid 16 and large square 17. Small square 15 has left and right edges 18 and 19 and a top edge 20. Trapezoid 16 has left and right edges 21 and 22 and bottom edge 23. Large square 17 has left and right edges 24 and 25 and bottom edge 26.

Adverting to FIG. 3, a top view of table surface 13 connected to extension table 27 is shown. Extension work surface 28 is generally U-shaped, having outer layer 36 made of a plastic laminate, such as formica. The laminate layer allows a smooth movement of the work piece over the entire cutting surface. Extension work surface 28 also has a base portion 29 and arms severally indicated at 30 attached adjacent each end of base portion 29. Base portion 29 has external edge 31 and internal edge 32. Each extension arm 30 has exterior edge 33, interior edge 34 and end edge 35. End edge 35 connects interior edge 34 and exterior edge 33.

Base portion internal edge 32 simulates the shape formed by edges 18, 19, 20, 21 and 22 of small square 15 and trapezoid 16. Therefore, a tight engagement occurs when extension work surface 28 and table surface 13 are joined. Adverting to FIG. 4, clamp 39 securely holds table saw support 38 against block 41, thus, firmly attaching extension table 27 to table saw 10. An extension table can be designed for any table saw. For example, FIG. 5 shows extension table 42 mated with a circular table surface 43.

Arm interior edges 34 are a distance from left edge 24, right edge 25, and bottom edge 26 thus, forming gaps 44 and 45. Gap 44 provides the saw operator the ability to manipulate a work piece form its bottom surface. Further, arm interior edges 34 and bottom edge 26 form gap 45, allowing the saw operator to stand close to cutting blade 14 for accurate and precise cuts. Gap 45 allows this precision without reducing the ability of extension table 27 to support larger work pieces.

Adverting now to FIGS. 3 and 6, each arm 30 incorporates the components of guide fence apparatus 72. Each arm 30 has a guide fence channel 47. A cross-section of guide fence channel 47 is shown to be generally U-shaped with flanges 48. Each guide fence channel 47 ends flush to edge 35, thus, allowing easy insertion of T-bolt 49. T-bolt 49 has a T-end 50 and a second end 51. T-end 50 can be inserted underneath flanges 48 but will not fit between flanges 48. Second end 51 is sized to pass between flanges 48.

Guide fence 46 has openings, severally indicated at 52, near either end. Each opening 52 allows second end 51 of T-bolt 49 therethrough. In one embodiment of the invention, ratchet clutch 53 is adapted to fixably grasp second end 51. Other devices and methods can be used to grasp second end 51. One such example is a wingnut. Using ratchet clutch 53 to grasp second end 51 locks T-end 50 flush to flanges 48 and also locks guide fence 46 against extension work surface 28 providing a stable, straight edge for guiding cuts.

Cutting blade 14 has circular cutting surface 54. There are many types of circular cutting surfaces. Adverting to FIG. 7, one example is shown. Cutting blade 14 moves vertically up and down in a piston motion perpendicular to table surface 13 and is capable of cutting in all directions perpendicular to its vertical movement. Circular cutting surface 54 is a sharpened, thin protrusion wrapping and descending around main body 55. In operation, as cutting blade 14 moves vertically up and down, circular cutting surface 54 contacts a portion of the work piece. As cutting blade 14 continues to move, circular cutting surface 54 cuts away a layer of a work piece along the line of motion of cutting blade 14, no matter what direction a work piece is drawn against circular cutting surface 54. The freedom of movement circular cutting surface 54 provides allows the saw operator to cut intricate shapes.

To alter a cut angle first release ratchet clutches 53 which in turn release T-bolts 49. T-bolts 49 are then free to slide along guide fence channels 47, thus, repositioning guide fence 46. Next, use ratchet clutches 53 to lock guide fence 46 against a new location on extension work surface 28. This system allows the operator to change cutting angles while performing a cut.

For example, adverting to FIGS. 8 and 9, lines 56 through 59 of work piece 60 can be consecutively cut. First, guide fence 46 is locked in place a distance from cutting blade 14 representing the distance from edge 61 of work piece 60 to line 56. Edge 61 of work piece 60 is drawn along guide fence 46 until cutting blade 14 reaches the point where lines 56 and 57 meet. Guide fence 46 is released and moved away from cutting blade 14 allowing free movement of work piece 60. Work piece 60 is then rotated clockwise 90° and guide fence 46 is placed flush against edge 62 and locked into place. Work piece 60 is drawn along guide fence 46 until cutting blade 14 reaches the point where line 57 meets line 58. This process is repeated each line 56 through 59 have been cut.

Figure 11:
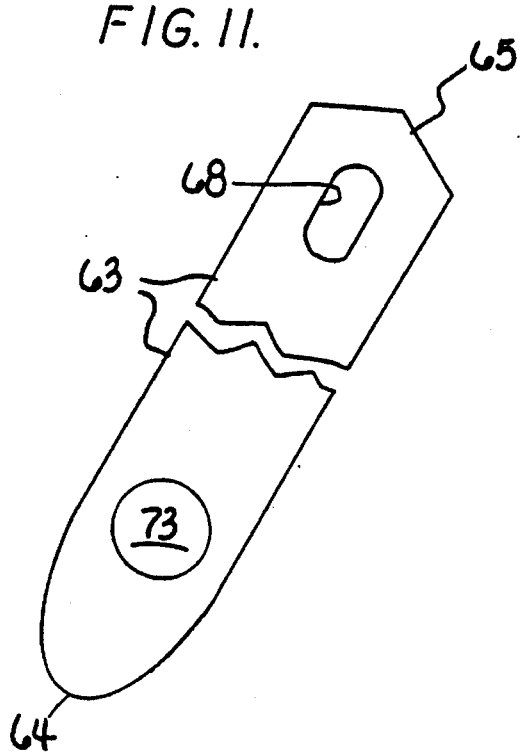
FIG. 11 is a fragmentary front plan view of a support leg.
Figure 13:
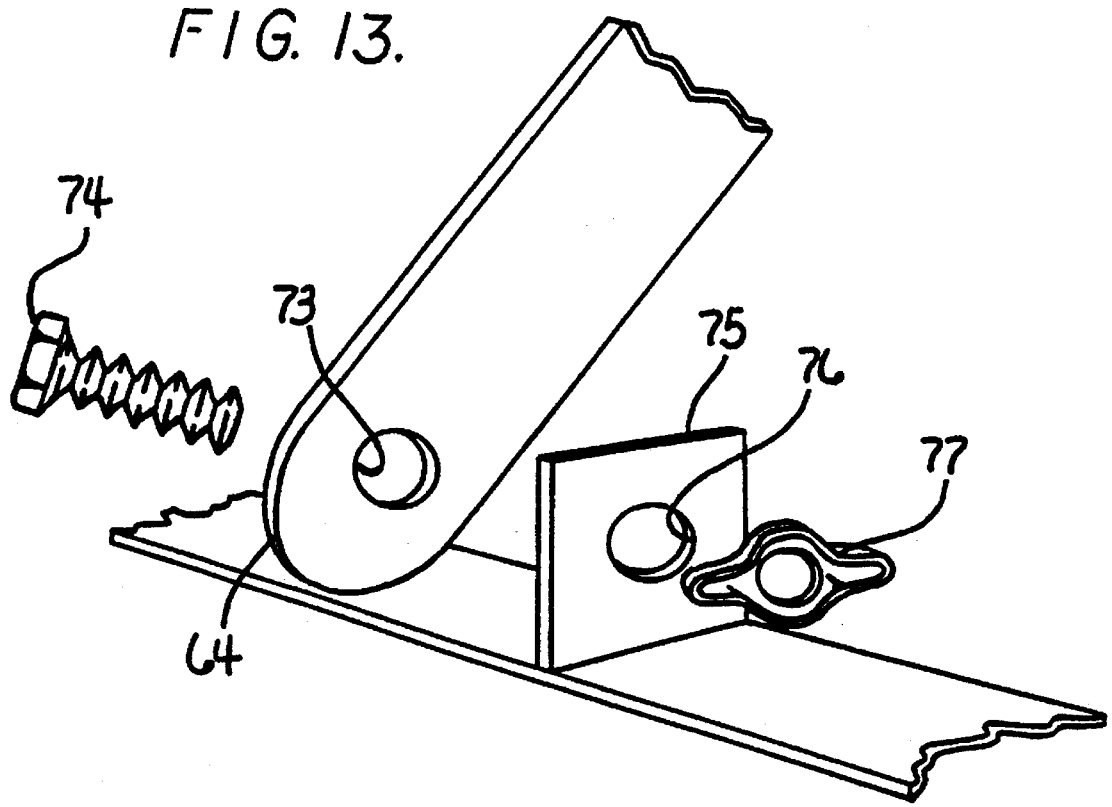
FIG. 13 is an exploded perspective view of the extension table support.

Adverting to FIGS. 10, 11 and 13, extension table 27 is primarily supported from table saw 10 using four legs severally indicated at 63. Each leg has first end 64 and second end 65. First end 64 is rounded having opening 73 adapted to fit bolt 74 therethrough. Plate 75 has opening 76 substantially the same size as opening 73. To attach first end 64 to beam 66, openings 73 and 76 are lined up and bolt 74 proceeds therethrough. Wing nut 77 screws onto bolt 74 locking plate 75 to first end 64. Each leg 63 adjusts in length by telescoping and also rotates about the bracket that fixes it to extension work surface 28. It is also possible for first end 64 to be flat allowing legs 63 to support extension table 27 from the floor.

Figure 12:
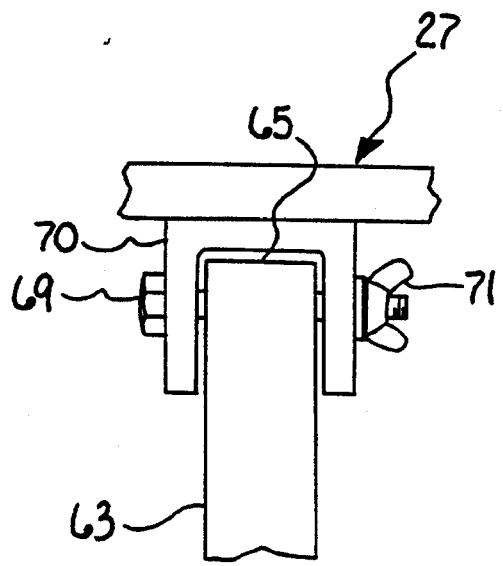
FIG. 12 is a fragmentary right elevation of a leg and bracket joined.

Adverting now to FIGS. 10, 11 and 12, second end 65 has an opening 68 adapted to receive bolt 69 therethrough. Bolt 69 also passes through openings in either side of bracket 70. Wing nut 71, when tightened, fixes leg 63 against bracket 70, thus, forming an angle between extension work surface 28 and leg 63. When wing nut 71 is loosened, leg 63 may swing freely through an arc of approximately 180°, bounded in either rotatable direction by extension work surface 28.

The adjustability of legs 63 provides the ability to secure extension work surface 28 flush and parallel to table surface 13. Such orientation prevents snagging of the work piece as it is drawn across the boundary between table surface 13 and extension work surface 28.

It is important at least two legs are used for support. The use of four or more legs allows for adjustment of extension table 27 to the peculiarities of each individual table saw 10, such as warping of support frame 11 from age or misuse.

MODIFICATION OF THE INVENTION

Although an extension table is disclosed using specific parts, materials and structure, it is clear from the specifications, drawings and descriptions of the extension table many modifications and changes may be made without departing from the invention. The channel does not need to be U-shaped nor do the flanges need to be the shape specified in this specification. The T-bolt can be replaced by a slide including a pair of opposed slots which snap onto and slidably engage or ride longitudinal slides attached to the channel.

Further, the clamp attaching the extension table to the table saw may be of any style.

These and other modifications and changes to the invention would be readily apparent to one skilled in the art and anticipated by the specification and description of the invention, as well as the following claims.

What is claimed is:

1. In an table saw system having a table surface, and having a cutting blade having a circular cutting surface moving generally perpendicular to said table surface, and having a support frame, an extension table comprising:
   an extension work surface having a top and a bottom surface, and having a base portion, and having first and second arms;
   said base portion having an external edge and an internal edge;
   said first and second arms each having a first end adjacent an end of said base portion, and a second end extending away therefrom;
   said extension work surface attached to said table surface at said base portion internal edge;
   said first and second arms having longitudinal guide channels, and having an exterior edge and an interior edge, each said interior edge being a distance from said table surface forming a first work gap and a second work gap;
   legs attached to said bottom surface;
   a guide fence apparatus having a guide fence, and having first and second members and locking means;
   said guide fence having a top edge and a bottom edge, and having a plurality of openings between said top and bottom edges;

said first and second members having first and second ends, said first end adapted to engage said guide channel, said second end adapted to fit through said opening; and said locking means adapted to engage said second end of a member to secure said guide fence to said extension work surface.

2. The extension table described in claim 1 wherein said locking means is a push button ratchet clutch.

3. The extension table described in claim 1 wherein said locking means is a wing nut.

4. The extension table described in claim 1 wherein said legs have first and second ends said second end, attached to said bottom surface and said first end adapted to connect to said support frame.

5. The extension table described in claim 4 wherein said second end is rotatably attached to said bottom surface by adjustable brackets allowing attachment of said first end to support frames of different height and construction.

6. The extension table described in claim 4 wherein said legs telescope allowing attachment of said first end to support frames of differing height and construction.

7. The extension table described in claim 1 wherein said top surface is covered by a plastic laminate.

8. The extension table described in claim 1 wherein said first and second members are T-shaped bolts.

9. The extension table described in claim 1 wherein said table surface is rectangular.

10. The extension table described in claim 1 wherein said table surface is circular.

* * * * *